United States Patent

[11] 3,626,432

| [72] | Inventors | Henry B. Fohl |
| | | Wellston; |
| | | Frank Korski, Brentwood, both of Mo. |
| [21] | Appl. No. | 888,525 |
| [22] | Filed | Dec. 29, 1969 |
| [45] | Patented | Dec. 7, 1971 |
| [73] | Assignee | Emerson Electric Co. |
| | | St. Louis, Mo. |

[54] TILT TOP TOOLING PLATE FOR COIL ASSEMBLY MACHINES
12 Claims, 4 Drawing Figs.

| [52] | U.S. Cl. | 29/205 |
| [51] | Int. Cl. | H02k 15/06 |
| [50] | Field of Search | 29/205 D, 606, 596, 205 |

[56] References Cited
UNITED STATES PATENTS

| 2,432,267 | 12/1947 | Adamson | 29/596 |
| 3,324,536 | 6/1967 | Hill | 29/205 |
| 3,494,027 | 2/1970 | Harelson | 29/606 |

*Primary Examiner*—Thomas H. Eager
*Attorney*—Polster and Polster

ABSTRACT: A coil assembly apparatus for axially inserting prewound coils and wedges in the slots of the stator core for an electric motor has the tooling normally associated with transfer winding and bore wedge insertion attached to a platform that is in turn hinge mounted to the machine frame. The platform is moveable from closed, operating, position to open position by a hydraulic cylinder or the like. A hydraulically activated ram transmits power to the tooling through a separable connector. In the open, raised position of the platform, the tooling attached to the underside of the hinged platform is disconnected from the ram, accessible to operator or maintenance personnel, and readily manipulatable.

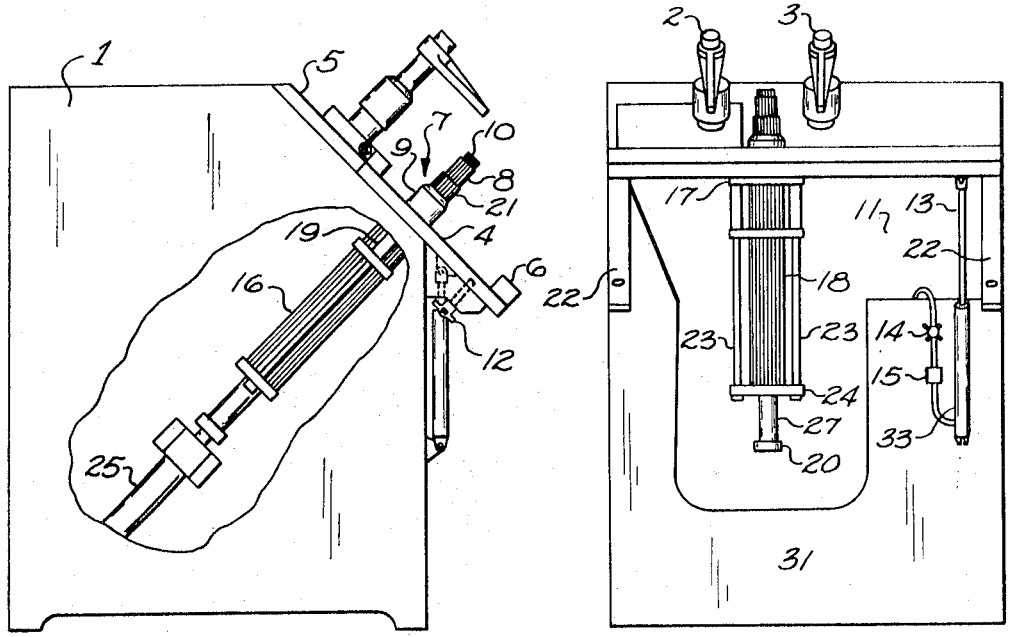
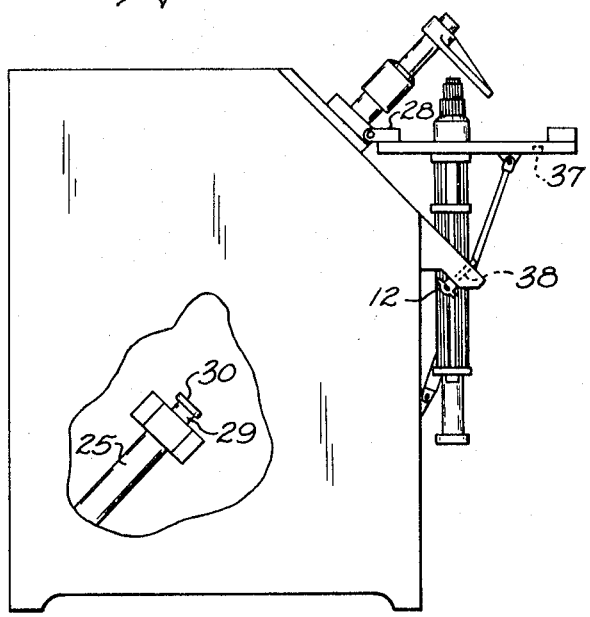
Fig 1
Fig 2
Fig 3
Fig 4
INVENTOR
HENRY B. FOHL
FRANK KORSKI

TILT TOP TOOLING PLATE FOR COIL ASSEMBLY MACHINES

BACKGROUND OF THE INVENTION

This invention relates to an improvement in the apparatus used to insert winding coils axially into stator cores, commonly known as coil assembly apparatus or coil inserters.

The history of this method of construction for dynamoelectric machines and particularly electric motors can be obtained by referring to the U.S. patents to Adamson, No. 2,432,267 and Hill, No. 3,324,536. Insertion machines based on this art generally have a cylindrical array of axially parallel fingers or blades. One end of the fingers is mounted on a platform or base plate, and the free end of the fingers extends upwardly. Also mounted on the base plate, in equal number to the fingers, are wedge guide members. On the enclosed commercial machines in use today, the base plate, finger and wedge guide arrangement have come to be called the upper tooling. The array of fingers is proportioned so that each finger will engage and cover the inside face of a single tooth of a stator core. A fluted impeller, commonly called a stripper, is slidably mounted within the finger array, and fillets of the stripper extend through gaps between the fingers. The stripper is mounted on the free end of a piston rod which permits travel of the stripper from a lower position several inches below the free end of the fingers to an upper position above the free end of the finger array. Additional pieces of equipment, in the form of pusher rods, wedge magazine and guide rods are provided for inserting bore wedges simultaneously with winding insertion. This combination of elements, that is, the stripper ram, pusher rods, wedge magazine and guide rods, has come to be known as the lower tooling because it is enclosed and positioned below the working surface of the machine in commercial practice. The prior art fixed part or all of these elements within an enclosure. Although removal was possible, once the machine was set up for operation, easy access to certain operative elements was impossible. Enclosed in most commercial embodiments are a supply of wedge material, an associated feed system, and standard hydraulic or electrical systems to power the various operative positions of the apparatus. Placement of these elements also inhibits access ability.

While this prior art machine works well for its intended purpose, inherent difficulties have plagued it. There is a tendency for the wedge material to jam or for the pusher rods to foul on the blade arrangement. This is a special problem where the apparatus is subject to heavy, continuous, production line use. Improved design of the upper and lower tooling does reduce the incidence of occurrence. However, any machine downtime causes loss of production.

In present machines, the lower tooling and wedge insertion mechanisms are particularly difficult to reach. Consequently, such a mechanically minor and relatively frequent misfunction as a jammed wedge in the far reaches of the apparatus requires removal of much of the lower tooling assembly, and much downtime. Replacement of a bent wedge pusher rod requires even more dismanteling under awkward conditions, hence more downtime.

One of the objects of this invention is to provide quick access to the lower tooling assembly. Another object of this invention is to permit isolation of a blocked or jammed wedge without lower tooling assembly removal.

Yet another object of this invention is to provide an arrangement which permits hand feed, manual actuation of the lower tooling in order to check the alignment and operation of the apparatus.

Still another object of this invention is to provide an arrangement which permits both upper and lower tooling assemblies to be changed quickly.

Other objects will become apparent to those skilled in the art in the light of the following description and accompanying drawings.

SUMMARY OF THE INVENTION

In accordance with this invention generally stated, a coil assembly apparatus is provided with a hinge-mounted platform to which both the upper and lower tooling are attached. The actuator used to drive the impeller of the machine transmits power to the lower tooling assembly through a separable connector.

In the preferred embodiment, the platform if moved by hydraulic means through an arc of approximately 45°. The platform is locked in the down position. The opened or raised position of the platform exposes the lower tooling assembly, including the wedge magazine, outside the enclosure encompassing the apparatus proper.

BRIEF DESCRIPTION OF THE DRAWING

In the drawings,

FIG. 1 is a side view, partly broken away, of one illustrative embodiment of the apparatus of this invention shown in the normal operating position;

FIG. 2 is a side view, partly broken away, of the apparatus shown in FIG. 1 with a top platform shown in the open, raised position;

FIG. 3 is a front view of the apparatus with the top platform shown in the open, raised position; and FIG. 4 is a fragmentary detail view in side elevation, partly broken away, of a separable connector and actuator rod in their normal operating position.

DESCRIPTION OF THE PREFERRED EMBODIMENT

Referring now to FIG. 1 for one illustrative embodiment of this invention, reference numeral 1 indicates an enclosure for a coil inserter to which this invention relates. Enclosure 1 is essentially a rectangular box with one edge cut away to support a working surface mounted on the frame at a 45° angle with the horizontal plane. In the present invention, the working surface includes a stationary section 5 and a tilt top platform 4 hinged to the stationary section 5 by means of heavy block and pin-type hinges 28, as shown in FIGS. 1 and 2. Core clamps 2 and 3 are journaled in bearings mounted of the outer surface of section 5 by screws or similar means of attachment. In this embodiment, the core clamps are adjustable heightwise from the surface in order to accommodate various stator core stacking heights and swing toward and away from one another to permit loading and unloading. The construction and core holding operation of these clamps are conventional. A control panel 6 is attached to the lower end of the tilt top platform 4 and contains various functional controls and indicator lights used during operation of the machine. An upper tooling assembly 7 is removably mounted to top platform 4 by bolts, screws or split rings in a conventional manner. Upper tooling 7 includes an array of fingers or blades 8 and a plurality of wedge guides 21 arranged around and attached to a hollow hub 9. Hub 9 fits over and through an opening in, and is removably mounted on platform 4. The cylindrical array of fingers 8 define an open passage and a stripper 10 is free to pass along the entire length of the fingers, through the openings in the platform 4 and hub 9. In the embodiment shown, the stripper 10 has a fluted head and a long stem. When further refinement in the upper tooling is desired, it is common to journal mount hub 9. The rotation capability thus acquired aids the machine operator in placing prewound coils in position for insertion.

Enclosure 1 has a front panel 31 in which there is an opening 11 below the inclined top platform 4, as is best seen in FIG. 3. A yokelike boss 22 is anchored to the enclosure at either side of the front panel 31. Boss 22 overhangs front panel 31 and a wingnut 12 fixed to a bolt 38 is each overhang serves releasably but positively to clamp the platform and frame of the enclosure when the platform in its normal down position. The lower surface of top platform 4 has tapped holes 37 into which the bolts 38 tighten, preventing platform movement when coil insertion takes place.

A hydraulic system for moving top plate 4 about the hinges 28 includes a hydraulic cylinder 33, hinge mounted at its lower end to the external surface of enclosure 1, a ram 13, a needle valve 14, and a speed control valve 15 along with their associated connections, leading to a hydraulic supply system not here shown.

A lower tooling assembly 16, removably mounted on a wide, angular flanged lower surface 17 of hub 9, includes a plurality of pusher rods 18, a wedge magazine 19, guide rods 23 and the stripper 10. A carriage 24 is free to ride guide rods 23. The pusher rods 18, and the stem of the stripper 10 are mechanically attached to carriage 24, which in turn is secured to a rod 27 of a connector 20. The lower tooling assembly 16 of the embodiment shown, insofar as the pusher rods, wedge magazine, stripper, guide rods and carriage are concerned, along with the interaction of the upper and lower tooling, is conventional and substantially described in the U.S. patent to Hill, No. 3,324,536.

The lower tooling assembly 16 is actuated by a hydraulic actuator 25 secured to the enclosure 1 or its associated frame by any convenient method, such as welding or bolt down. While the preferred embodiment utilizes a conventional hydraulic actuator, it is contemplated that an oil-damped air-cylinder actuator of the type described in R. Harrelson's pending application, Ser. No. 684,171 filed Nov. 20, 1967, and now U.S. Pat. No. 3,494,027, issued Feb. 10, 1970, may be used in embodiments of this invention. Actuator 25 has an actuator rod 29 with a circular head 30, which engages connector 20 when platform 4 is in its lowered position. As shown in FIG. 4, connector 20 consists of an open mouth socket 26 defined by an upper wall 34 and a lower wall 35 with a U-shaped slot 36 in it, extending from the mouth of the socket, and connecting rod 27. Connecting rod 27 is secured at its upper end to carriage 24. Since the lower tooling assembly rotates with the platform 4 as the platform is raised, connector 20 separates from actuator rod 29. The interior surfaces defining the slot 36 may be chamfered to aid in positioning the head 30 and connector 20 during lowering of the platform.

Rotation of top platform 4 on hinges 28 causes rotation of lower tooling assembly 16 through opening 11. As seen in FIG. 2, where tilt top platform 4 is shown in its open, raised position, the lower tooling assembly is completely accessible. In this position, mere hand pressure on connector 20 causes manual actuation of the lower tooling assembly and the interaction of the upper and lower tooling assemblies may be observed easily. Manual actuation of the tooling assemblies provides numerous advantages. One advantage is that it makes it easy to check tooling alignment and make quick adjustments. Another is that it makes it possible to isolate jammed wedges and clear such jams with little or no production delay.

Simple operation of top platform 4 is provided. Wingnuts 12 are disengaged and needle valve 14 is open. The main hydraulic system is then actuated. Since valve 14 is open, the hydraulic system will extend ram 13 and raise platform 4. When platform 4 reaches it raised position, needle valve 14 is closed. The fluid trapped by the valve 14 will lock the platform in the raised position and the main hydraulic system can be disconnected. The travel of platform 4 may be controlled in several ways. For example, either the hinge arc may be limited mechanically, or the length of rod travel may be varied. Speed control valve 15 may be adjusted to alter the speed with which platform 4 is raised. Platform 4 is lowered by slowly opening needle valve 14 until platform 4 again reaches its normal position. Valve 14 is then tightened and wingnuts 12 are turned so as to resecure the platform.

Some coil inserters are supplied with indexing means to provide bore wedges in selected stator core slots. This additional equipment may require detachment before top plate 4 is raised.

Platform 4 may be stopped at any angle of rotation by selective manipulation of needle valve 14. Such partial rotation is useful in tooling assembly removal. By rotating the platform so as to disengage the connector 20 from the head 30, and releasing the means securing hub 9 to platform 4, both upper and lower tooling assemblies may be removed by extracting the assemblies from and through the opening in platform 4. Connector 20 may be constructed integral with the lower tooling assembly or made interchangeable with other assemblies by making connecting rod 27 divisible yet continuous as by a clevis, for example.

Numerous variations in the construction of this invention, within the scope of the appended claims, will occur to those skilled in the art in the light of the foregoing disclosure. For example, the entire working surface of the apparatus may be hinge mounted. Because of the greater weight involved in such an embodiment, additional support may be required to maintain platform 4 in its raised position. The larger radius of rotation in such an embodiment also requires a longer ram 13 in order to bring the platform to a horizontal plane. The shape of the enclosure or the opening through which access is attained may be varied. Likewise, the shape of connector 20 or slot 36 may be changed. The socket 26 may be secured to the actuator rod 29, and the head 30 to the connecting rod 27, provided that proper orientation of the rod 29 is ensured, as by a guide so as to keep the open mouth of the socket directed toward the head. The control panel 6 may be made separate from the platform 4 and fasten elsewhere on the enclosure. These variations are merely illustrative.

Having thus described the invention, what is claimed and desired to be secured by Letters Patent is:

1. A coil assembly apparatus, which comprises:
   an enclosure;
   a mounting platform hingedly mounted to said enclosure;
   means for axially inserting a prewound coil into the core of a dynamoelectric machine mounted to said platform;
   means for power driving said axially inserting means operatively connected to said axially inserting means;
   means for rotating said hingedly mounted platform; and
   means for detachably connecting said axially inserting means and said power-driving means.

2. The apparatus of claim 1 wherein said means for detachably connecting said axially inserting means and said power-driving means comprises an open-mouth socket having an inner wall and an outer wall with a slot opening at the open mouth of the socket, and a shaft with a disc head projecting radially therefrom to define an annular shoulder therewith, said head being of a diameter greater than the width of the slot and the shaft being of a diameter less than the width of the slot, said socket being operatively connected to one of said power-driving means and said axially inserting means and said shaft and head being operatively connected to the other of said power-driving means and said axially inserting means, and means for maintaining the orientation of said socket with its mouth towards said head.

3. The coil assembly apparatus of claim 1 wherein said rotating means is adapted to move said hingedly mounted platform between at least a first and a second position; said axially inserting means comprises an upper tooling assembly and a lower tooling assembly mounted to said hingedly mounted platform; and said enclosure has a front panel with at least an opening in it large enough to admit said lower tooling assembly, said lower tooling assembly being positioned on the platform with respect to the hinge axis of the platform and to the front panel so as to enable said lower tooling assembly to move through said opening when said platform is moved between said first and second positions, said lower tooling assembly being contained within said enclosure at one of said first and second positions and said lower tooling assembly being outside the confines of said enclosure at the other of said first and second positions.

4. The apparatus of claim 3 wherein said rotating means comprises a hydraulic actuator, mounted on said enclosure, said actuator being operatively connected to move said platform between said first and second position.

5. A coil assembly apparatus, which comprises:
   an enclosure;
   a mounting platform rotatably mounted of said enclosure;

means for axially inserting a prewound coil into the core of a dynamoelectric machine, said means comprising a first assembly mounted above said platform and a second assembly mounted below said platform;

means for providing said axially inserting means;

means for rotating said platform between closed and open positions, said second assembly being exposed externally of said enclosure in said open position, and said second assembly being within said enclosure in said closed position; and means for detachably connecting said second assembly to said powering means.

6. The apparatus of claim 5 wherein said means for detachably connecting said second assembly to said powering means comprises a socket having an opening therein and a shaft with a disc head projecting radially therefrom, adapted for detachably mounting to said socket, said socket being operatively connected to one of said powering means and said second assembly, said shaft and head being operatively connected to the other of said powering means and said second assembly.

7. A coil assembly apparatus, which comprises:

an enclosure having at least one opening therethrough and including a mounting platform mounted to permit rotation of said platform with respect to said enclosure;

means for axially inserting a prewound coil into the core of a dynamoelectric machine, said means including a tooling assembly mounted to and below said platform;

means for powering said axially inserting means;

means for rotating said platform between closed and open positions, said open position being defined when said tooling assembly is rotated to an exposed position externally of said enclosure through said opening and said closed position being defined when said tooling assembly is within said enclosure and operatively engaged with said powering means; and means for detachably connecting said axially inserting means and said powering means.

8. The apparatus of claim 7 wherein said detachable connecting means comprises an open-mouth socket having an inner wall and an outer wall with a slot opening at the open mouth of the socket, and a shaft with a disc head projecting radially therefrom to define an annular shoulder therewith, said head being of a diameter greater than the width of the slot and the shaft being of a diameter less than the width of the slot, said socket being operatively connected to one of said powering means and said tooling assembly and said shaft and head being operatively connected to the other of said powering means and said tooling assembly, and means for maintaining the orientation of said socket with its mouth towards said head.

9. The improvement of claim 7 wherein said means for rotating said platform comprises a hydraulic actuator, mounted on said enclosure and operatively connected to said platform, said actuator being adopted to move said platform from closed to open position.

10. In a coil assembly apparatus including an enclosure, and means for axially inserting a prewound coil, the improvement which comprises a platform rotatably mounted to said enclosure having said axially inserting means attached thereto.

11. The improvement of claim 10 further characterized by means for power driving said axially inserting means operatively connected thereto and means for detachably connecting said power-driving means and said axially inserting means.

12. The improvement of claim 11 wherein said detachably connecting means comprises an open-mouth socket having an inner wall and an outer wall with a slot opening at the open mouth of the socket, and a shaft with a disc head projecting radially therefrom to define an annular shoulder therewith, said head being of a diameter greater than the width of the slot and the shaft being of a diameter less than the width of the slot said socket being operatively connected to one of said power-driving means and said axially inserting means and said shaft and head being operatively connected to the other of said power-driving means and said axially inserting means, and means for maintaining the orientation of said socket with its mouth toward said head.

* * * * *

UNITED STATES PATENT OFFICE
CERTIFICATE OF CORRECTION

Patent No. 3,626,432    Dated December 7, 1971

Inventor(s) Henry B. Fohl and Frank Korski

It is certified that error appears in the above-identified patent and that said Letters Patent are hereby corrected as shown below:

In the Abstract, after "readily" cancel "manipulatable" and insert ---manipulable---.

Column 2, line 41, after "mounted" cancel "of" and insert ---on---; line 70, after "bolt 38" cancel "is" and insert ---in---.

Column 4, line 75, after "mounted" cancel "of" and insert ---to---.

Column 5, line 5, after "for" cancel "providing" and insert ---powering---; line 19, after "assembly," insert ---and---.

Signed and sealed this 3rd day of October 1972.

(SEAL)
Attest:

EDWARD M. FLETCHER, JR.
Attesting Officer

ROBERT GOTTSCHALK
Commissioner of Patents